(12) United States Patent
Quigley et al.

(10) Patent No.: US 9,342,802 B2
(45) Date of Patent: May 17, 2016

(54) SYSTEM AND METHOD OF TRACKING RATE OF CHANGE OF SOCIAL NETWORK ACTIVITY ASSOCIATED WITH A DIGITAL OBJECT

(75) Inventors: Paul Quigley, County Limerick (IE); Andrew Mullaney, County Sligo (IE)

(73) Assignee: NEWSWHIP MEDIA LIMITED, Dublin (IE)

( * ) Notice: Subject to any disclaimer, the term of this patent is extended or adjusted under 35 U.S.C. 154(b) by 129 days.

(21) Appl. No.: 13/409,561

(22) Filed: Mar. 1, 2012

(65) Prior Publication Data

US 2013/0036169 A1 Feb. 7, 2013

Related U.S. Application Data

(60) Provisional application No. 61/515,453, filed on Aug. 5, 2011.

(51) Int. Cl.
| | |
|---|---|
| *G06F 15/16* | (2006.01) |
| *G06Q 10/00* | (2012.01) |
| *G06Q 50/00* | (2012.01) |

(52) U.S. Cl.
CPC .............. *G06Q 10/00* (2013.01); *G06Q 50/01* (2013.01)

(58) Field of Classification Search
CPC ............. G06Q 50/01; G06Q 30/0277; G06Q 30/0269; G06F 17/30864; G06F 17/3053; G06F 17/3071; H04L 67/22; H04L 2209/60; H04L 51/32
USPC .......... 709/204–207, 232, 203, 229; 707/748, 707/999.03; 705/319
See application file for complete search history.

(56) References Cited

U.S. PATENT DOCUMENTS

| | | | | |
|---|---|---|---|---|
| 6,353,390 B1* | 3/2002 | Beri | ................... | G08B 13/1427 340/572.1 |
| 8,055,655 B1* | 11/2011 | He | .................... | G06F 17/30867 707/727 |
| 2007/0226212 A1* | 9/2007 | Aggarwal | ............ | G06K 9/6284 |
| 2008/0176655 A1* | 7/2008 | James | ................. | G06F 19/3475 463/42 |
| 2010/0169327 A1* | 7/2010 | Lindsay | .................. | H04L 12/58 707/750 |
| 2011/0113096 A1* | 5/2011 | Long | ...................... | G06Q 30/02 709/204 |
| 2011/0208749 A1* | 8/2011 | Guo | ....................... | G06Q 50/01 707/748 |
| 2012/0124200 A1* | 5/2012 | Ramadass | .......... | H04L 63/1408 709/224 |
| 2012/0158461 A1* | 6/2012 | Aldrey | ............... | G06Q 30/0201 705/7.35 |

(Continued)

FOREIGN PATENT DOCUMENTS

EP 2 271 057 A1 1/2011

*Primary Examiner* — Lisa Lewis
*Assistant Examiner* — Lizbeth Torres-Diaz
(74) *Attorney, Agent, or Firm* — Ohlandt, Greeley, Ruggiero & Perle, L.L.P.

(57) ABSTRACT

A system of tracking rate of change of social network activity associated with a digital object includes a change measurement module in communication with at least one social network database and a ranking module in communication with the change measurement module. The change measurement module measures a change in the level of social network activity associated with the digital object based on a first object value and a second object value. The first object value is based on a measurement of activity associated with the digital object in at least one social network at a first time, and the second object value is based on a measurement of activity at a second time. The ranking module ranks the digital object relative to at least one other digital object based on a score derived from a rate of change in social network activity.

20 Claims, 12 Drawing Sheets

(56) References Cited

U.S. PATENT DOCUMENTS

| | | | | |
|---|---|---|---|---|
| 2012/0158851 A1* | 6/2012 | Kelmenson | G06F 17/30864 | 709/205 |
| 2012/0254333 A1* | 10/2012 | Chandramouli | G06F 17/27 | 709/206 |
| 2013/0091147 A1* | 4/2013 | Kim | G06F 17/30663 | 707/748 |
| 2014/0156674 A1* | 6/2014 | Alberth, Jr. | G06F 17/30312 | 707/748 |

* cited by examiner

EXCLUSIVE: Interview with a 20-year-old Irish tech millionaire-Start Ups-Start-Ups|siliconrepublic.com-Ireland's Technology News Service — 32a

← 32b

Two years ago, the entire nation was stunned when the news emerged that two Limerick for US$5m. There was no long journey to Silicon Valley for them, they built a product,
Source: siliconrepublic.com — 32c
SCORE: 44.6631025232198 — 32d

← 32

Tipperary casino complex granted planning permission-The Irish Times-Mon. June 13, — 34a

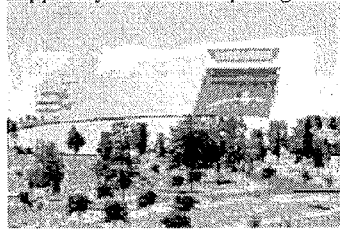
← 34b

An Bord Pleanala has given the go-ahead for
the construction of a €460 million "Las 34c Vegas-style" sports and leisure complex in
Source: irishtimes.com — 34d
SCORE: 26.7276150571245

← 34

GE buys Irish smartgrid software from FMC-Tech-Green Tech-Green Tech||siliconrepublic.com-Ireland's Technology News Service — 36a

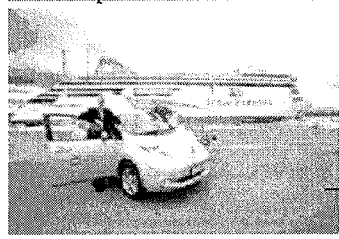
← 36b

GE buys Irish smartgrid software from FMC-Tech. Photo: Jamie McWilliam of Scottish FMC-Tech; and David MacLeman of Scottish and Southern Energy, at the Energy
Source: siliconrepublic.com — 36c
SCORE: 14.1349709529745 — 36d

← 36

First ESB electric car fast-charge point opens in Monaghan-Green Tech-Green Tech||siliconrepublic.com-Ireland's Technology News Service — 38a

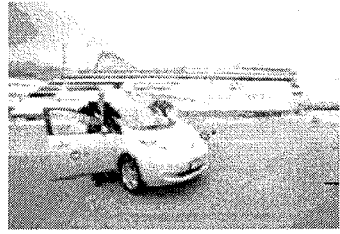
← 38b

32b teenagers John and Patrick Collison had sold their first technology company bought their plane tickets and just went.

2011

34b

Co Tipperary.

36b

Power. Denise Massey of Energy Innovation Centre. Mike McCormack of Innovation Awards last year

| url_score_id | scoretype | score_num | url_id | score_date |
|---|---|---|---|---|
| 1 | FaceBookShares | 1 | 2 | 2011-06-10 12:04:29.0 |
| 2 | FaceBookShares | 3 | 3 | 2011-06-10 12:04:29.0 |
| 3 | FaceBookComments | 86 | 4 | 2011-06-10 12:04:29.0 |
| 4 | FaceBookShares | 280 | 4 | 2011-06-10 12:04:29.0 |
| 5 | FaceBookLikes | 270 | 4 | 2011-06-10 12:04:29.0 |
| 6 | FaceBookComments | 41 | 5 | 2011-06-10 12:04:29.0 |
| 7 | FaceBookShares | 134 | 5 | 2011-06-10 12:04:29.0 |
| 8 | FaceBookLikes | 240 | 5 | 2011-06-10 12:04:29.0 |
| 9 | FaceBookShares | 3 | 6 | 2011-06-10 12:04:29.0 |
| 10 | FaceBookComments | 7 | 7 | 2011-06-10 12:04:29.0 |
| 11 | FaceBookShares | 28 | 7 | 2011-06-10 12:04:29.0 |
| 12 | FaceBookLikes | 29 | 7 | 2011-06-10 12:04:29.0 |
| 13 | FaceBookShares | 8 | 8 | 2011-06-10 12:04:29.0 |
| 14 | FaceBookLikes | 7 | 8 | 2011-06-10 12:04:29.0 |
| 15 | FaceBookComments | 132 | 9 | 2011-06-10 12:04:29.0 |
| 16 | FaceBookShares | 220 | 9 | 2011-06-10 12:04:29.0 |
| 17 | FaceBookLikes | 571 | 9 | 2011-06-10 12:04:29.0 |
| 18 | FaceBookShares | 17 | 10 | 2011-06-10 12:04:29.0 |
| 19 | FaceBookLikes | 9 | 10 | 2011-06-10 12:04:29.0 |
| 20 | FaceBookComments | 184 | 11 | 2011-06-10 12:04:29.0 |
| 21 | FaceBookShares | 78 | 11 | 2011-06-10 12:04:29.0 |
| 22 | FaceBookLikes | 125 | 11 | 2011-06-10 12:04:29.0 |
| 23 | FaceBookComments | 69 | 12 | 2011-06-10 12:04:29.0 |
| 24 | FaceBookShares | 157 | 12 | 2011-06-10 12:04:29.0 |
| 25 | FaceBookLikes | 232 | 12 | 2011-06-10 12:04:29.0 |
| 26 | FaceBookComments | 16 | 13 | 2011-06-10 12:04:29.0 |

FIG. 5

| url_id | url_loc | cou... | s... | img_loc | headline | news_summary |
|---|---|---|---|---|---|---|
| 7 | http://techcr... | USA | 1 | http://tctechcrunch.files.... | Coder Recruiting Platfor... | Codeéval takes ... |
| 12 | http://techcr... | USA | 1 | http://www.crunchbase.c... | Google Acquires AdMeld... | This is a sweet c... |
| 19 | http://techcr... | USA | 1 | http://techcrunch.comN... | Social Cinema Mubi Sign... | Mubi bills itself ... |
| 32 | http://masha... | USA | 2 | http://5.mshcdn.com/wp... | Nintendo Wii U: First Imp... | The Wii U is Nin... |
| 33 | http://masha... | USA | 2 | http://5.mshcdn.com/wp... | 9 Lessons From Successfu... | Brands are begi... |
| 39 | http://masha... | USA | 2 | http://9.mshcdn.com/wp... | 7 Les Paul Google Doodle... | If you've used G... |
| 40 | http://masha... | USA | 2 | http://5.mshcdn.com/wp... | Twitter Will Automate Ad... | Adam Bain, Twi... |
| 41 | http://masha... | USA | 2 | http://8.mshcdn.com/wp... | Congress Members Prod... | The lesson here... |
| 43 | http://masha... | USA | 2 | http://7.mshcdn.com/wp... | Why Business Collaborati... | Creating a bette... |
| 49 | http://masha... | USA | 2 | http://7.mshcdn.com/wp... | How Agencies Are Spendi... | These days, TV ... |
| 50 | http://masha... | USA | 2 | http://mashable.comNO L... | Like Cats? You'll Love Thi... | A little video bu... |
| 53 | http://masha... | USA | 2 | http://5.mshcdn.com/wp... | Fab.com Relaunches Wit... | Visitors can see ... |
| 56 | http://www.b... | USA | 3 | http://static7.businessinsi... | Apologies! We're having ... | Here's the Twitt... |
| 57 | http://www.b... | USA | 3 | http://static8.businessinsi... | Ads Matt Groening, Simp... | At Apple, Groen... |
| 58 | http://www.b... | USA | 3 | http://static7.businessinsi... | Google Has The Highest ... | The survey look... |
| 62 | http://www.b... | USA | 3 | http://static6.businessinsi... | Google is Using Ancient ... | Imagie James ... |

SYSTEM AND METHOD OF TRACKING RATE OF CHANGE OF SOCIAL NETWORK ACTIVITY ASSOCIATED WITH A DIGITAL OBJECT

FIELD OF THE INVENTION

This invention relates generally to online social networks. More particularly, it relates to using information from social networks to create information that may be used to rank or measure interactions with digital content.

BACKGROUND

In the discussion of the background that follows, reference is made to certain structures and/or methods. However, the following references should not be construed as an admission that these structures and/or methods constitute prior art. The inventor expressly reserves the right to demonstrate that such structures and/or methods do not qualify as prior art.

Online social networks permit individuals to share and distribute information, including photographs, news, opinions, and links to websites external to the social network. These social networks, which include Facebook.com (Facebook), MySpace.com (MySpace), Twitter.com (Twitter), and LinkedIn.com (LinkedIn), provide a platform on which many individuals publish or distribute information to one another.

Social networks facilitate among their members communication associated with events or objects external to the social networks. Many public figures use Twitter, a micro-blogging platform and social network, to communicate information directly to followers, interested individuals, the press, and fans. Many private individuals use Facebook or LinkedIn to communicate with their friends and associates. As part of these communications, individuals sometimes share a Uniform Resource Locator (URL) associated with a particular piece of digital content, such as a news story, media content, or web page.

However, no apparatus, system, or method can provide information regarding a rate of change in activity or a speed of spread on a social network or multiple social networks regarding a particular piece of digital content in the manner of the present invention. Additionally, no apparatus, system, or method can rank a piece of digital content against another piece of digital content based on the rate of change of activity or the speed of spread through online social networks. Accordingly, there is a need in the art for an apparatus, system, or method that can provide information regarding the rate of change of activity on a social network or social networks regarding a piece of digital content, and in particular, an apparatus, a system, or a method that can rank this digital content based on the rate of change of such activity.

SUMMARY

An exemplary embodiment provides a system of tracking a rate of change in a level of social network activity associated with a digital object. The system can include a change measurement module in communication with at least one social network database and a ranking module in communication with the change measurement module. The change measurement module can measure a change in the level of social network activity associated with the digital object. The change in the level of social network activity can be based on a first object value determined at a first time and a second object value determined at a second time. The first object value can be based on a measurement of activity associated with the digital object in at least one social network at the first time, and the second object value can be based on a measurement of activity associated with the digital object in at least one social network at the second time. The change measurement module can determine a rate of change of social network activity based on a difference between the first time and the second time. The ranking module can rank the digital object relative to at least one other digital object based on a score derived from the rate of change in social network activity.

The system may repeat this process multiple times and may rank a defined set of thousands or millions of digital objects using the rate of change in social network activity relating to each object. The rate of change may represent the velocity at which each digital object is spreading through social networks.

Another exemplary embodiment provides a method of tracking rate of change of social network activity associated with a digital object. The method can include identifying, by a processor of a computer system, one or more digital object sources; monitoring, by the processor, the one or more digital object sources; identifying, by the processor, a digital object provided by at least one of the digital object sources; categorizing, by the processor, the digital object; sending, by the processor, a first query to one or more social networks to determine a first level of activity related to the digital object; recording, by the processor, results of the first query; allowing, by the processor, a period of time to pass; sending, by the processor, a second query to one or more social networks to determine a second level of activity related to the digital object; determining, by the processor, a change in activity related to the digital object; determining, by the processor, a rate of change in activity related to the digital object; and assigning, by the processor, a score based on the rate of change in activity.

Another exemplary embodiment provides a computer system, including a processor connected to a computer-readable memory. The memory can contain instructions that when enabled by the processor implement a method of tracking rate of change of social network activity associated with a digital object. The method can include: identifying one or more digital object sources; monitoring the one or more digital object sources; identifying a digital object provided by at least one of the digital object sources; categorizing the digital object; sending a first query to one or more social networks to determine a first level of activity related to the digital object; recording results of the first query; allowing a period of time to pass; sending a second query to one or more social networks to determine a second level of activity related to the digital object; determining a change in activity related to the digital object; determining a rate of change in activity related to the digital object; and assigning a score based on the rate of change in activity.

Other objects, advantages and salient features of the invention will become apparent from the following detailed description, which, taken in conjunction with the annexed drawings, discloses an embodiment. It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements, and in which:

FIGS. 4(*a*) and 4(*b*) are an exemplary output of the system shown in FIG. 1;

FIG. 5 is an exemplary output of the system shown in FIG. 1;

Figure 1:
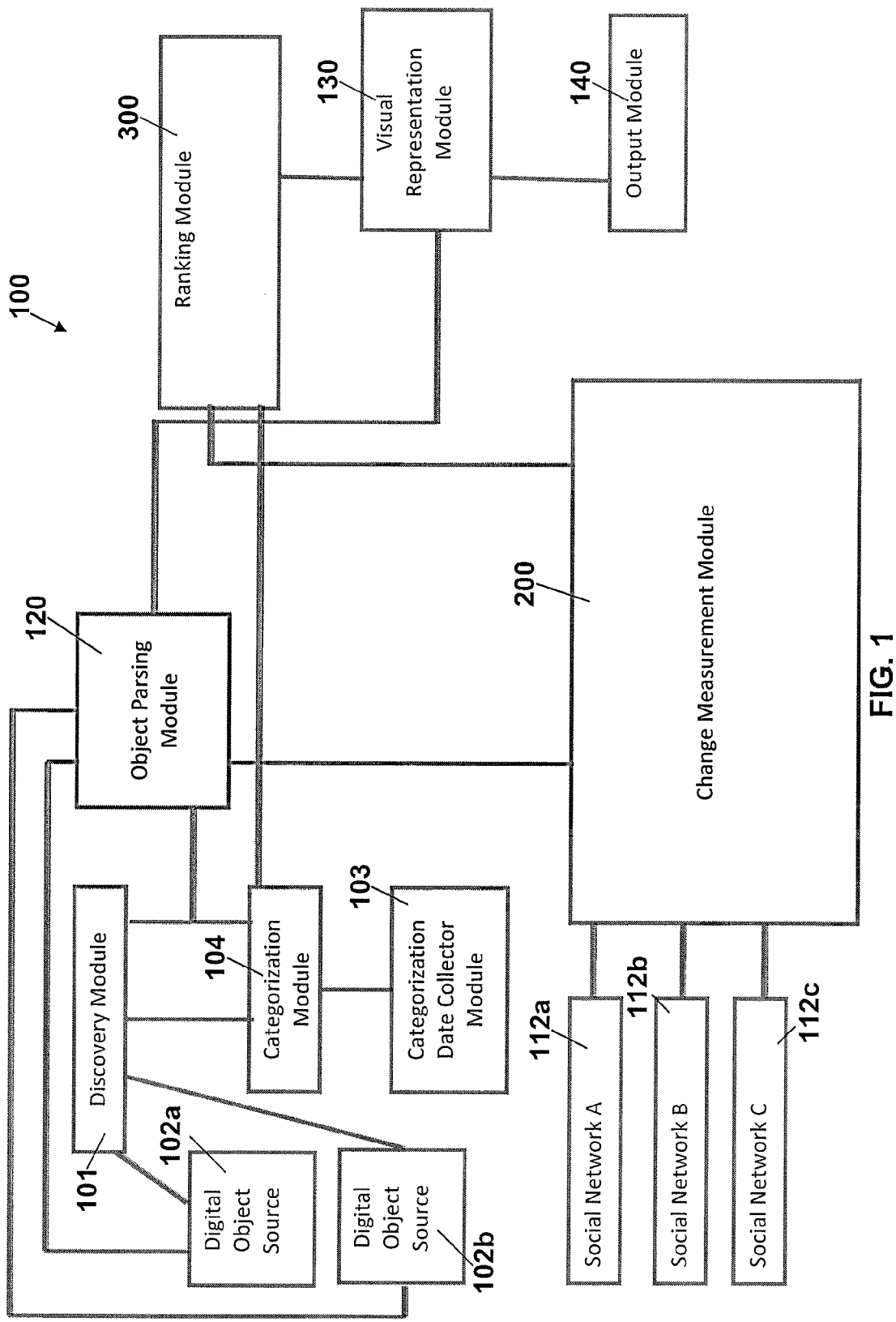
FIG. 1 is a block diagram of a digital object ranking system in accordance with an embodiment.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Embodiments relate to measuring social network activities and determining a rate of change of social network activities associated with a digital object or a speed of spread associated with a digital object in order to rank the digital object against other digital objects designated as related by the invention or some external source. The digital object can include, for example, online news stories, product web pages, or political web pages. The digital object may be external to the social network.

Digital objects that are external to social networks may be assessed and ranked, each according to their type, by a system and a method that can measure and determine the rate of change of activity or the speed of spread associated with the digital objects in online social networks. Additionally, a level of social network activity associated with a digital object may be tracked over time, producing data that represents changes in the level of activity associated with the object or the speed of spread associated with the object.

By using an embodiment to track the rate of change of social network activity over time, data may be derived or created regarding the digital object. In one embodiment, digital objects of a particular type (such as online news stories associated with an individual URL and relating to a particular topic or topics) may be tracked, and values derived for the rates of change of activity associated with the objects in multiple social networks. In another embodiment, the digital object may be tracked and values derived for the speed of spread associated with the object.

In one embodiment, the appearance or publication of digital objects from particular sources can be monitored. The digital objects can be in the form of newly created URLs. The appearance or publication of digital objects can be monitored by a web crawler, RSS feed, or other forms of detecting digital objects. The object sources may be pre-identified. As digital objects are generated by the object sources or identified by monitoring object sources, the objects can be categorized according to, for example, their type, their subject, or geographic source. The categorization may be based on data within the digital object, or pre-defined information about the source, such as its location, title, topic area, or relative position within a website. For example, when a new URL is discovered, key information about the associated digital object may be extracted, including metadata, any description of the object, its publication time, or other data. This information may be inserted into a database for storage. Then, automated queries can be communicated to social networks including, but not limited to, Facebook, LinkedIn and Twitter, to determine the level of activity relating to the URL associated with the digital object. The level of social activity on one or more social networks for each URL may also be stored on a database. Based on the results of these queries, a score or scores can be assigned to the object. After a time period has elapsed, similar queries can be sent to the social networks, to determine an updated level of activity relating to the objects. Code can be executed, whereby the results of these queries can be compared with the results of previous queries, or the score or scores generated previously can be compared to an updated value or values relating to the digital object. This data can be combined with the length of the time periods between the sets of queries to derive a rate of change relating to each object. Using this information, a score or scores may be generated representing the rate of change of social network activity associated with the digital object. When such values are generated for multiple objects of the same type, these objects or representations associated with these objects may be ranked in accordance with these values or other values derived therefrom. Code for parsing and displaying the digital objects or the representations of these digital objects in a visually distinguishable and useful manner on a webpage can be generated. The objects or representations can be displayed in a manner related to their ranking. The objects or representations can also be displayed in a manner related to their ranking for particular sources, categories, or other designations. For example, the highest ranked objects for particular sources, categories, or other designations may be displayed. The entire process may be completed by use of code executed by a computer, server, or cloud based array.

In another construction of the embodiment, the location or preferences of an end user of the system or method may influence its function by indicating a preference for particular digital objects. The preferences can be based on, for example, subject matter types, geographic sources, or associations with other digital objects or other social network users. The system or method may use data on social network activity relating to a digital object from multiple social networks to weight or blend the data as desired. The method may also involve using a statistical device or an algorithm to add emphasis to particular objects based on their geographic relationship or other relationship with the end user. Similarly, this entire process may be completed by use of code executed by a computer, server, or cloud based array.

In an alternative construction of the embodiment, the system or method may be used to track the rate of change of social network activity associated with a digital object, and to establish correlations between this rate of change and external events.

Referring to the figures, a system 100 can measure changes in a level of social network activity associated with a digital object. The system 100 can then use the measured changes to calculate a rate of change of social network activity associated with the digital object. The calculated rate of change of social network activity associated with the digital object can then be used for purposes, such as, ranking one or more digital objects based on the rate of change of activity associated with one or more digital objects over a period of time.

Turning to FIG. 1, the system 100 can include a discovery module 101, one or more digital object sources 102a and 102b, a categorization module 104, a categorization data collector module 103, an object parsing module 120, a change measurement module 200, and a ranking module 300. The system 100 can further include a visual representation module 130 and an output module 140.

The discovery module 101 can find at least one digital object within one or more digital object sources 102a and 102b. The one or more digital object sources 102a and 102b, which generally can be some form of content producing digital platform, such as a website, can be first identified, and can then be monitored by the system 100. The digital object sources 102a and 102b may be identified by an end user of the system 100, an administrator of the system 100, or an automated process within the system 100, such as a web crawler or a computer program that can browse the world wide web or pre-identified portions of the world wide web to detect and/or index content. For example, in one construction of the system 100, an administrator or end user of the system 100 can manually identify sources within one or more websites, can manually categorize the sources, and can use the categorized sources for the system 100. The source can be, for example, an RSS feed or a particular subsection of a website where a given category of content is published. These sources may be used to identify and categorize digital objects.

After at least one digital object source 102a or 102b is found, the discovery module 101 can monitor at least one digital object source 102a or 102b for new digital objects. The monitoring process may involve using a web crawler or other computer program to identify new digital objects within or from the digital object source 102a or 102b, or may rely on published announcements or syndication from the digital object source 102a or 102b. A software product or service external to the system 100 described herein may be used for the identification of new digital objects. For example, in one construction of the system 100, the system 100 can monitor RSS feeds and crawl websites programmed into or pre-selected by an operator of the system 100. The digital object may comprise a news story, video, audio file, blog, event, topic, photograph, product website, product webpage, political website, political webpage, music, other media, or any digitally stored object embodied in some form on the internet, a local network, or some other form of sharing digital data. A digital object can be identified by, for example, a URL, a hyperlink, or any other unique digital identifier for the digital object on the world wide web. The discovery module 101 may be based on a computer, a server, or spread across an array of linked computers or servers.

When the discovery module 101 finds one or more digital object sources 102a and 102b, the categorization module 104 can categorize the digital objects of the digital object sources 102a and 102b. The categorization data collector module 103 can input data related to categorizing to the categorization module 104. The categorization module 104 may use data inputted by an administrator or end user of the system 100 in order to correctly categorize the digital object. The data may include editorial decisions made by the administrator. For example, the administrator may identify a digital object source 102a or 102b as being located in the United Kingdom ("UK"), and producing or linking to content relating to technology and business. The categorization module 104 can automatically categorize any input from this source 102a or 102b as UK, technology, and business. A single website or digital platform producing digital objects may contain multiple sources. Alternatively, an object may be categorized using several other methodologies, including but not limited to: its characteristics, such as metadata containing information that indicates that the object is of a certain type; forms of digital content associated with the digital object (such as video, audio, image, or other file types); keywords associated with or contained in the digital object; categorization by a third party source, such as an external index that indicates that a digital object is of a certain type, or that objects associated with a particular digital object source are of a certain type; categorization by system users; categorization by administrators; or categorization by social network users.

The data used for the categorization process can include, for example, information previously determined and inputted regarding at least one of the digital object sources 102a and 102b, information derived from the one or more digital object sources 102a and 102b, information stored in the system 100, and information requested from an external source. Thus, digital objects from one or more digital object sources 102a and 102b can be collected and categorized.

The object parsing module 120 can gather data from a digital object and parse the data. The data from the digital object may include, for example, a picture, text, a video file, an audio file, metadata, or some other information. The data from the digital object is parsed so that a parsed summary representing the digital object can be provided. The parsed summary can be a parsed summary file representing the digital object. For example, when the digital object is a news story containing text and an image, the parsed summary file or files may contain a headline from the news story; some keywords associated with the story; summary text relating to the story; a thumbnail picture or other rendering of the image associated with the story; the publication or website or other digital platform where the story may be found; feedback or reactions relating to the story from third parties, system users, or social network users; and ranking or scoring information associated with the popularity or level of activity associated with the story online.

The change measurement module 200 can determine a rate of change in social network activity related to a particular digital object. Social network activity may include any actions within any social network that may be associated with the digital object. For example, social network activities can include publishing a URL of a digital object on the social network (such as, "sharing" a story via Facebook or publishing the digital object into a post on Twitter); recommending a digital object using tools available through the social network (such as, "liking" or "recommending" via Facebook); using the social network to comment on or discuss the digital object provided or published by another social network user (such as, making a comment or otherwise interacting with a link shared by another user on Facebook); posting or sharing a link to the digital object within the social network (for example, publishing a link on Twitter or sharing a link on Facebook); commenting on a link to a digital object shared within the social network (such as a photo or other content published within the social network); using a social network account to comment on or otherwise interact with or engage with the digital object (such as using a Facebook or Twitter account to post a comment on a news article or blog post); using the social network account to recommend, approve of, or otherwise promote a digital object; using the social network to publish an opinion, reaction or comment relating to the digital object; using a social network to distribute or communicate the digital object; interacting socially with a digital object either external or internal to the social network within the network; and any other measurable social network activity that may be associated with the digital object. The change measurement module 200 may measure any or all of these actions relating to a social network or to a particular social network account. The social network can be, for example, Facebook, MySpace, Twitter, LinkedIn, or any other platform on which many individuals publish or distribute information to one another.

Figure 2:
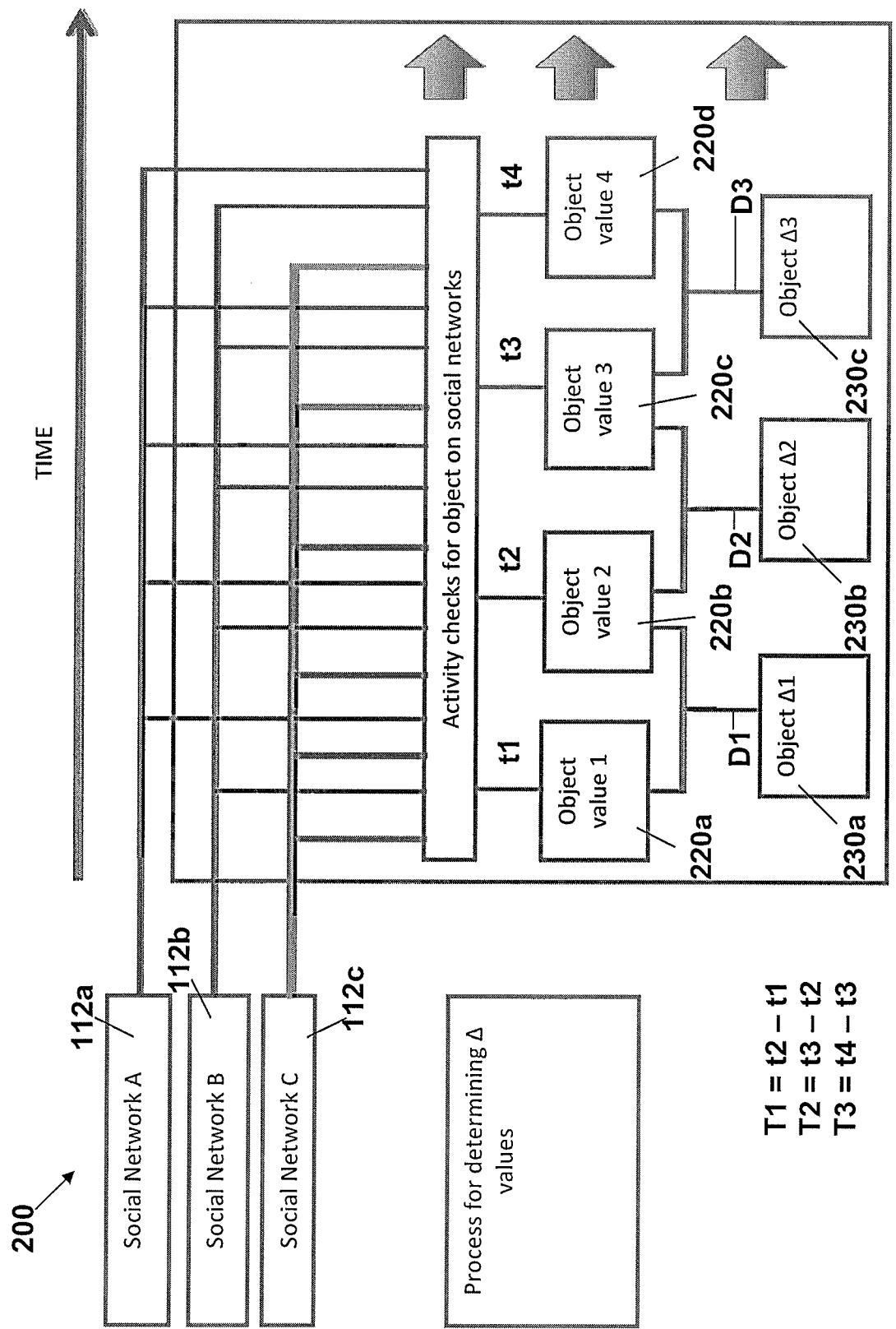
FIG. 2 is a diagram of a change measurement module of the system shown in FIG. 1.

Referring to FIG. 2, one construction of the change measurement module 200 is shown. In the construction shown, the change measurement module 200 can include code that can be executed by a processor and that can be used to determine the change in social network activity. The change measurement module 200 can be communicatively coupled to one or more social network databases 112*a*, 112*b*, and 112*c*. The system 100 may communicate with the social network databases 112*a*, 112*b*, and 112*c* via a web service application programming interface provided by the social network. For example, the system 100 may communicate with the social graph data provided by Facebook. The system 100 can use information from the social network databases 112*a*, 112*b*, and 112*c* to determine an object value 220. The system 100 may allocate differing weights to data points of different types from different social networks. For example, in one construction of the system 100, the object value 220 can be based on an "OverAllScore" that is determined as shown below:

$$OverAllScore = (FaceBookCommentsScore * 0.18) +$$
$$(FaceBookSharesScore * 0.37) + (FaceBookLikesScore * 0.11) +$$
$$(LinkedInSharesScore * 0.33) + (TweetCountScore * 0.01).$$

As shown above, some social networks can be weighted more than others, and some interactions can be weighted more than other. For example, the posting of a link on Facebook may be weighted ten times more than another type of social network interaction, the mentioning of a link in a Tweet may be weighted five times more than another form of social network interaction, a Facebook "like" or recommendation may be weighted four times more than another form of interaction, the sharing of a link on LinkedIn may be weighted fifteen times more than another form of interaction, a Facebook comment may be weighted two times more than another form of interaction, etc.

The system 100 can repeatedly measure the values 220 over time, thus determining multiple object values 220*a*, 220*b*, 220*c*, and 220*d*. The time period between each measurement may vary. These time periods may be set by a system administrator or may result from the length of time associated with the system's processes. In some instances, the time period can be as short as may be achieved using the amount of computing power contained within the system 100. A time period may be very short (seconds) or longer (hours). The time period may extend to days or lengthier periods for some digital object types or sources. The time period assigned to some objects can differ depending on the level of activity associated with the objects. Objects associated with higher levels of social network activity may be checked more frequently, possibly resulting in shorter periods of measurement.

However, the time period can also be measured and tracked by the system 100. For each digital object, the system 100 can then determine the change in social network activity since the previous time the system 100 obtained values 220*a*, 220*b*, 220*c*, and 220*d* for social network activity, and the length of time that has elapsed between each measurement. This information may be stored in a digital database or databases, linking each digital object with its associated categories, associated parsed information (such as text, images, and other information), measurements of social network activity relating to the objects, the timing of these measurements, the differences in time between these measurements, values derived from these measurements, and comparisons of changes in the values derived from these measurements.

In FIG. 2, the system 100 can check the change in social network activity over time for a given digital object. The change in activity may be calculated by determining the level of activity at sequential points in time, such as, t1, t2, t3, and t4. A recording of object value can occur between a difference in time or a time period T. The difference in time or the time period T may be calculated based on:

$$T1 = t2 - t1$$

$$T2 = t3 - t2$$

$$T3 = t4 - t3$$

The levels of activity at each time, t1, t2, t3 and t4 can be recorded as object values, 220*a*, 220*b*, 220*c*, and 220*d*. For example, at time t1, an object value 220*a* can be recorded; at time t2, an object value 220*b* can be recorded; at time t3, an object value 220*c* can be recorded; and at time t4, an object value 220*d* can be recorded. A difference D between each object value, such as 220*a*, 220*b*, 220*c*, and 220*d*, can represent the total change in social network activity. The difference D may be calculated based on:

$D1$=object value 220*b* at time $t2$−object value 220*a* at time $t1$ $D2$=object value 220*c* at time $t3$−object value 200*b* at time $t2$ $D3$=object value 220*d* at time $t4$−object value 220*c* at time $t3$ Using these values, an object Δ value, such as 230*a*, 230*b*, and 230*c*, representing the rate of change of activity associated with the digital object, may be derived based on.

$$\text{Object } \Delta 1 \ 230a = \frac{D1}{T1}$$

$$\text{Object } \Delta 2 \ 230b = \frac{D2}{T2}$$

$$\text{Object } \Delta 3 \ 230c = \frac{D3}{T3}$$

Where: T1, T2, T3=variable time periods
D1, D2, D3=differences in social network activity over each variable time period T1, T2, T3, respectively The object Δ value, such as 230*a*, 230*b*, and 230*c*, can change each time the system 100 gathers new object values including new social network activity measurements for an object. Hence, the speed of "spread" (or additional social network activity) of the object may be periodically derived and recorded within the system 100. The object value data based on object values 220*a*, 220*b*, 220*c* may be either weighted using variables, normalized in relation to other data, or otherwise subjected to changes before the difference D between each measurement is calculated. Similarly, the difference D between each measurement may be either weighted using variables, normalized in relation to other data, or otherwise subjected to changes before the rate of change of activity based on object Δ values 230*a*, 230*b*, 230*c* is derived.

Figure 3:
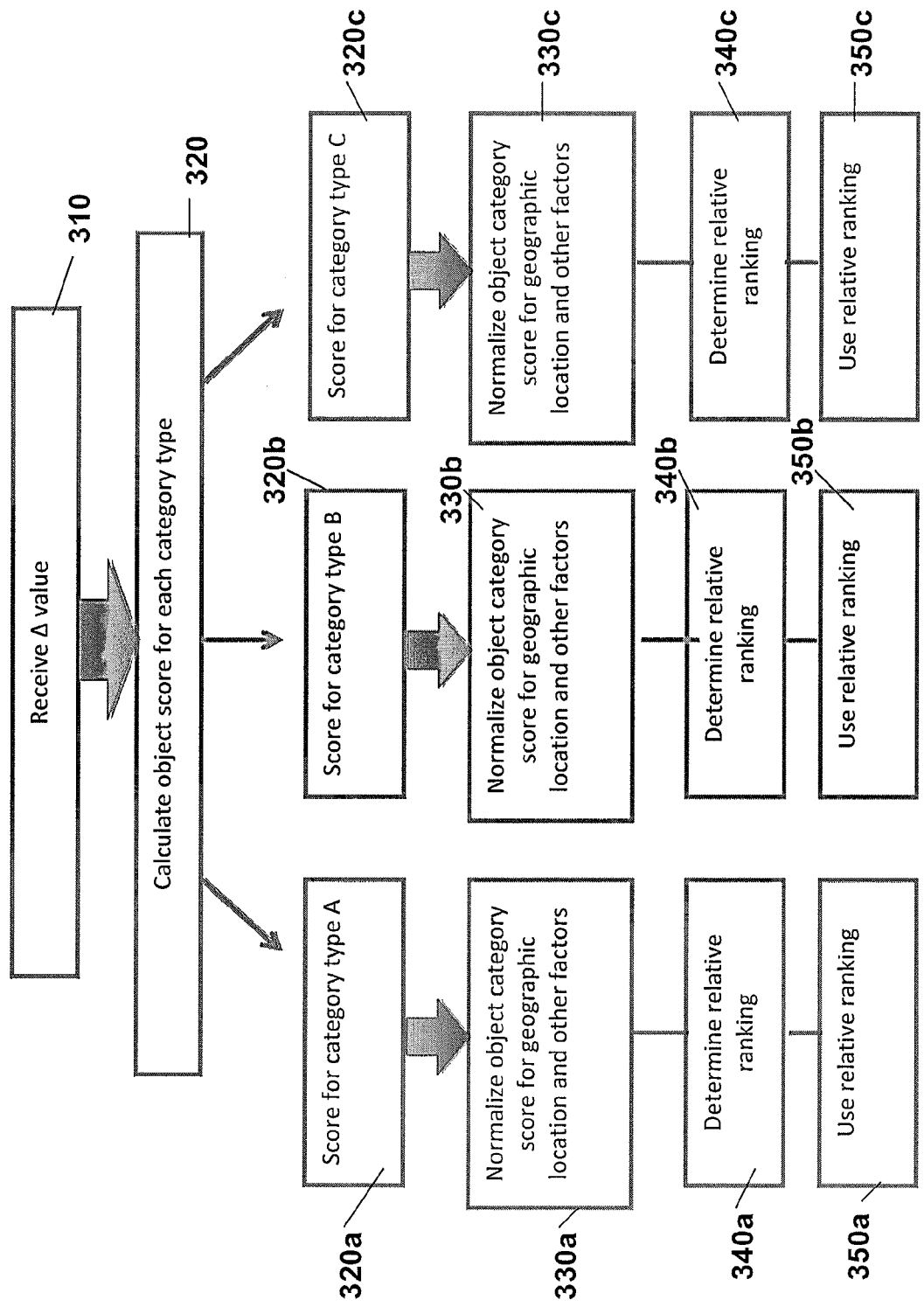
FIG. 3 is a flow chart representing a use of values obtained from the system shown in FIG. 1.

Returning to FIG. 1, the system 100 can include the ranking module 300. The digital objects can be ranked using the object Δ values, such as 230a, 230b, and 230c, over time generated by measuring the change in social network activity and other data. Referring to FIG. 3, a flow chart shows a process of using object Δ values or rate of change in social network activity to rank objects in accordance with an embodiment. The ranking may be generated at intervals T, or at other intervals that depend on the amount of resources available to the discovery module 101, the change measurement module 200, or other modules within the system 100. In one construction of the ranking module 300, the ranking may be dynamically refreshed within a category as new Δ values are gathered for each digital object in the category, and for new digital objects within the category. The Δ value for each object can be combined with other variables to provide a score 320 for the object. The other variables may include a total time passed since the discovery of the object by the system 100, a time at which measurement of the social activities took place, a time at which the object was created, and other variables. The variables may be adjusted to give greater prominence or higher scores to more recently created or discovered objects. The score for an object may also be adjusted for the object within each category type assigned to it by the categorization module 104. For example, within category type A the object may be given a score 320a; within category type B the object may be given a score 320b; and within category type C the object may be given a score 320c. The scores 320a, 320b, and 320c can be stored with the rank of each category type A, B, and C.

Additional information may then be added to these category scores 320a, 320b, and 320c to provide additional weight to the score associated with certain digital objects in relation to the score associated with other digital objects, depending on the objects' type, geographic source, time of publication, or other data. Among others, a process of statistical normalization 330 may be used to achieve a weighting between scores. This allows the system 100 to allocate additional weight to digital objects from sources 102a or 102b that are geographically closer or are otherwise of interest to the end user of the system 100. Thus, for example, for end users of the system 100 in the UK accessing online news stories, social network activity associated with those news stories that are produced in the UK or relate to the UK may be given a higher weighting. For example, in one construction of the system 100, for an end user in Ireland, a story from the UK can be given a lower weighting than a story from Ireland. The process of statistical normalization of scores from sets of data with differing distributions is familiar to any programmer of ordinary skill in the art.

Alternatively, the score 320 can be determined for each object using data from multiple measurements of social network activity values. In one embodiment, such multiple values may be used to degrade the score for a digital object over time.

$$\text{Score} = 220a(p) + 220b(q) + 220c(r) + \ldots 220n(s)$$

$$T1 + T2 + T3 + \ldots Tn$$

Where:
Score=The score used for ranking a given digital object.
220a=Social network activity at time t1
220b=Social network activity at time t2
220c=Social network activity at time t3
220n=Social network activity at time to
s, r, q and p are numbers where s>r>q>p
T1=t2−t1, T2=t3−t2, T3=t4−t3, Tn=t(n+1)−tn A normalized object category score 330a, 330b, and 330c can be applied to each digital object for each category A, B, and C, respectively. Using the normalized object category score 330a, 330b, and 330c, the objects may be ranked according to their relative weighted scores to determine a relative ranking 340a, 340b, and 340c. The relative ranking 340a, 340b, and 340c can then be used to provide a relative ranking 350a, 350b, and 350c. The relative ranking 350a, 350b, and 350c may then be used to generate a table, display, or other information to convey the rank of one or more digital objects. The same object may earn different relative scores in each subject category, represented by the numerals 340a, 340b, and 340c, resulting in variable rankings, 350a, 350b, and 350c.

Referring to FIGS. 4(a) and 4(b), an exemplary output 30 is shown. The output 30 can include a plurality of parsed representations of digital objects 32, 34, 36, and 38. Each of the plurality of these representations 32, 34, 36, and 38 can include a headline 32a, 34a, 36a, and 38a; a parsed excerpt 32b, 34b, 36b, and 38b from the digital object 32, 34, 36, or 38; a source description 32c, 34c, and 36c for each of representations 32, 34, and 36; and a score 32d, 34d, and 36d for each of the digital objects 32, 34, and 36 derived from the speed of social activity associated with the object, including a score derived in any of the manners described above. Digital objects 38 can also have a source description and a score, although the source description and the score is not shown in FIGS. 4(a) and 4(b).

A ranking module 300 can produce data 350a, 350b, and 350c that rank or that can otherwise be used to arrange digital objects. The data 350a, 350b, and 350c can determine relationships between digital objects. The digital objects and the relationships between the digital objects may be sent to the visual representation module 130. The visual representation module 130 can arrange the data into, for example, a visual arrangement that displays both the parsed objects and their ranking.

Referring to FIG. 5, an exemplary output 40 is shown. The output 40 can include a "url_score_id" 42 that can indicate the identification of the score in the system 100, a "scoretype" 44 that can indicate a portion that contributes to the score, a "score_num" 46 that can indicate the value of the score, a "url_id" 48 that can indicate an identification of a digital object in the system 100, and a "score_date" 50 that can indicate the time that the score was calculated.

Figures 6A, 6B:
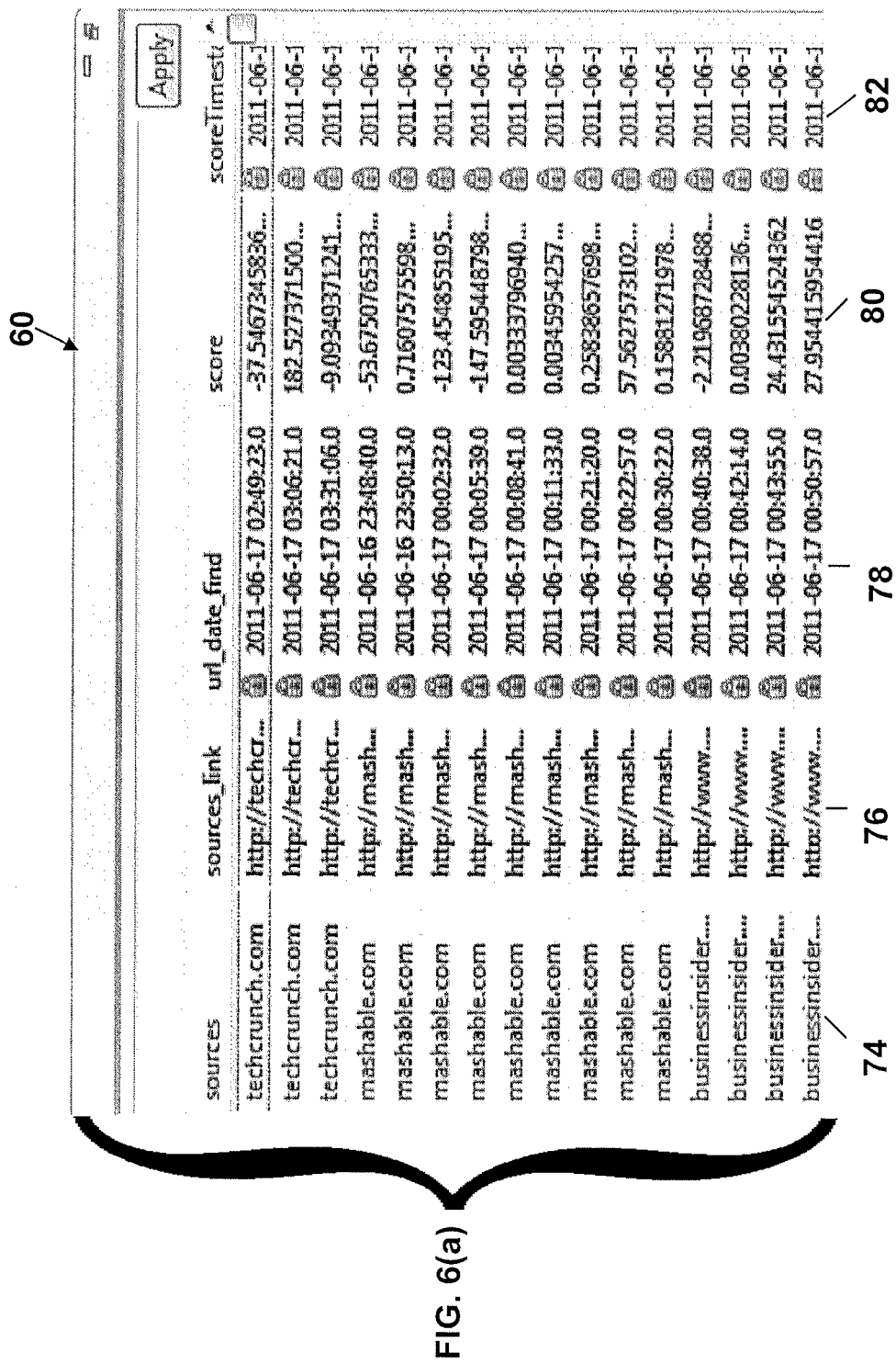
FIGS. 6(*a*) and 6(*b*) are an exemplary output of the system shown in FIG. 1.

Referring to FIGS. 6(a) and 6(b), an exemplary output 60 is shown. The exemplary output 60 can include a "url_id" 62 that can indicate the identification of the digital object in the system 100, a "url_loc" 64 that can indicate the location of the digital object in the world wide web, a "country" 66 that can indicate the location of the digital object, a "source_ID" 68 that can indicate the source of the object, a "img_loc" 69 that can indicate the location of any images associated with the digital object, a "headline" 70 that can indicate the headline or other leading description associated with a digital object, a "news_summary" 72 than can provide a summary of the digital object, a "sources" 74 that can indicate the digital object source, a "sources_link" 76 that can indicate the location of the digital object source on the world wide web, a "url_date_find" 78 that can indicate the time that the digital object was found by the system 100, a "score" 80 that can indicate the score 320, and a "scoreTimestamp" 82 that can indicate the time that the score 320 was calculated by the system 100.

In turn individual end users of the system 100 may access this information through the output module 140. The output module 140 can be, but not limited to, a web browser or mobile application. These end users may be served with parsed data associated with each digital object. This data may be arranged in a manner that indicates the rank of each digital object using the rate of change of social network activity associated with the digital object (Δ values divided by the time periods between each measurement of social network activity).

Figure 10:
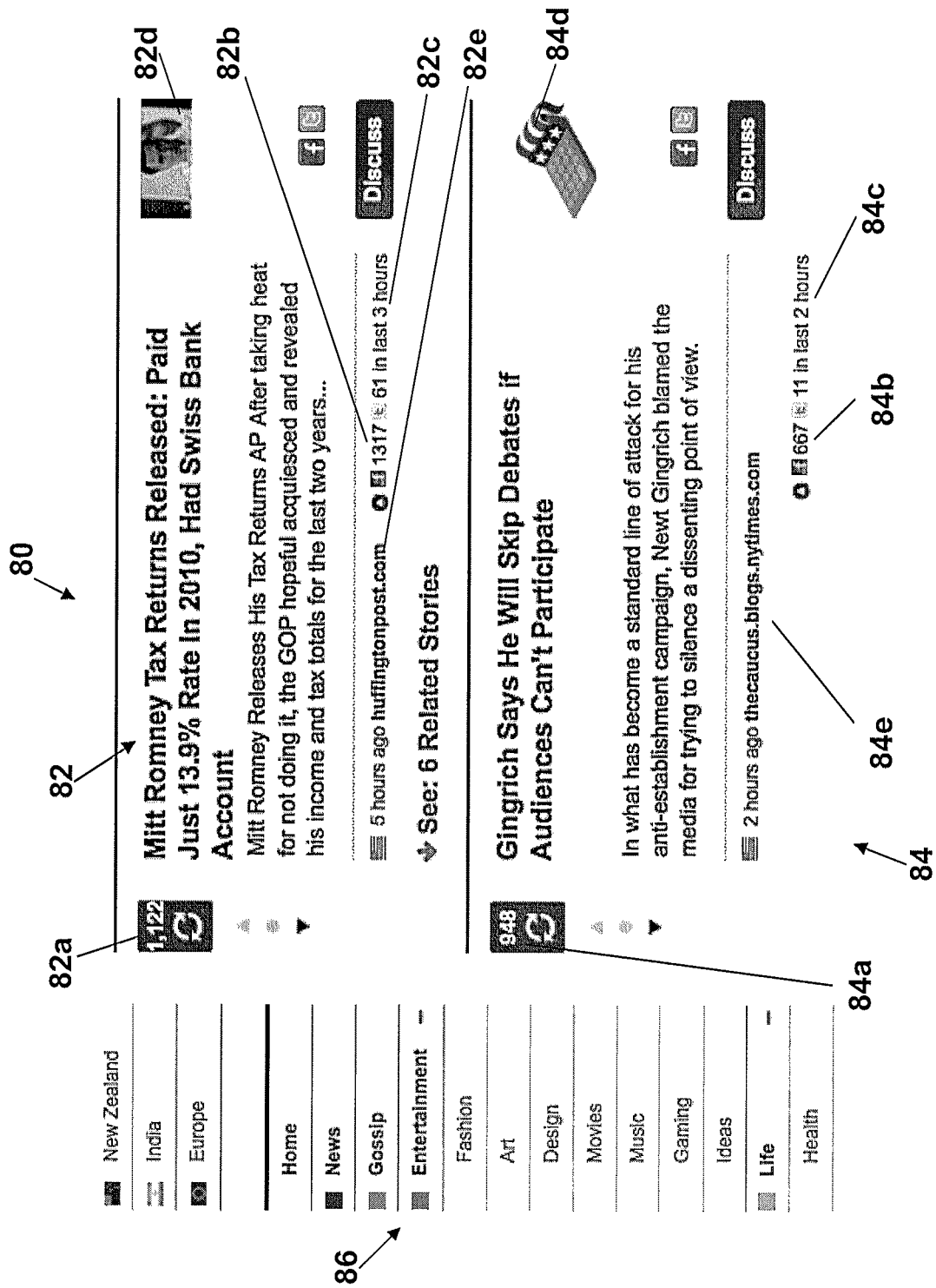
FIG. 10 is an exemplary output of the system shown in FIG. 1.

Referring to FIG. 10, an exemplary output 80 is shown. The output 80 can include one or more digital objects 82 and 84 and a menu 86 arranged adjacent to the one or more digital objects 82 and 84. Each digital object 82 and 84 can include a score 82a or 84a, a count 82b or 84b, a time period 82c or 84c, metadata 82d or 84d, and a source 82e or 84e. The output 80 may be generated by the visual representation module 130 (shown in FIG. 1) and appear in the output module 140 (shown in FIG. 1). The output 80 may be presented using Hypertext Markup Language (HTML) accessed by a user via a web browser or mobile application. The output 80 shown in FIG. 10 presents data from two digital objects 82 and 84, a news story 82 with the headline "Mitt Romney Tax Returns Released . . ." published on the website huffingtonpost.com; and a news story 84 with the headline "Gingrich says he will skip debates . . . ", published on the website thecaucus.blogs.nytimes.com. For each of these two objects 82 and 84, a numeric score 82a and 84a can be provided. The numeric score 82a and 84a can be derived from the Δ in social activity. A score representing the rates of change or A in social activity can be derived from the numbers of social actions (for example, as shown in FIG. 10, on Facebook and Twitter, represented with "f" and "t" counts 82b, 84b, respectively) over recent time period 82c for digital object 82 and time period 84c for digital object 84. In FIG. 10, the time period 82c for digital object 82 is 3 hours, and the time period 84c for digital object 84 is 2 hours. Metadata 82d, 84d associated with the digital objects 82, 84, such as an image, may be presented with the digital object 82, 84. The source 82e, 84e for the digital objects 82, 84 may be presented. As shown in FIG. 10, the source 82e, 84e can be a website. The user may also apply one or more filters to the digital objects 82, 84 presented. For example, the user may apply a filter by selecting to view only news from a particular category. The application of one or more filters may be accomplished by selecting options via the menu 86, which in turn is populated using data generated by the categorization module 104 (shown in FIG. 1) using data collected by the categorization data collection module 103 (shown in FIG. 1).

Figure 7:
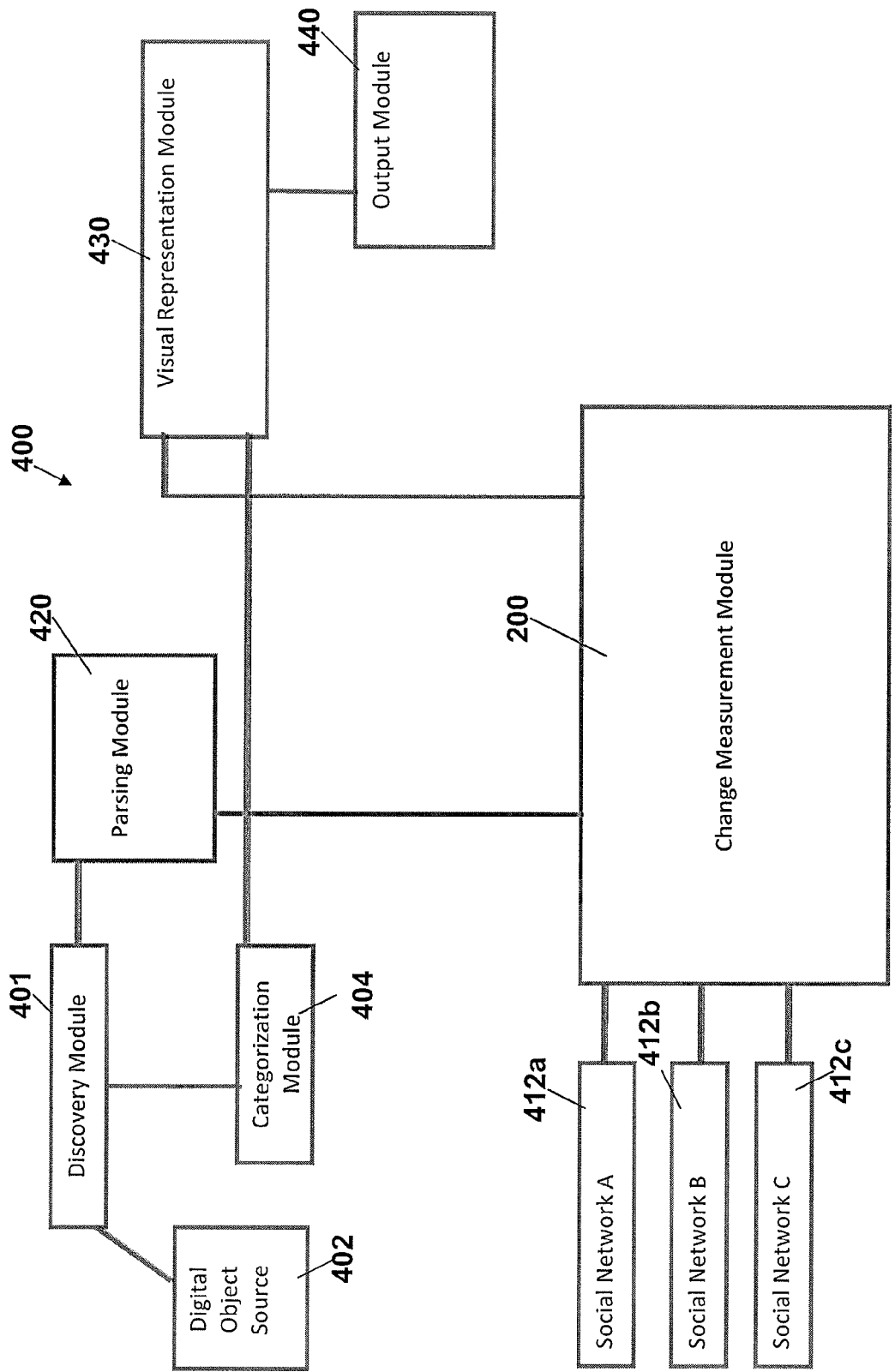
FIG. 7 is a block diagram of a digital object social activity tracking system in accordance with an embodiment.

Embodiments may also be applied to measuring changes over time in the rate of social network activity associated with a digital object or multiple digital objects. Referring to FIG. 7, a diagram representing a digital object social activity tracking system 400 in accordance with an embodiment is shown. The system 400 may monitor changes over time in the rate of social media activity associated with a single digital object.

The system 400 can include a discovery module 401, a categorization module 404, and a parsing module 420. The system 400 can also include a change measurement module 200. The system 400 can repeatedly measure activity relating to the object from multiple social networks 412a, 412b, and 412c and the time between measurements. The measured activity and the time between measurements may be used to determine multiple Δ values associated with the digital object over time. The measured activity, the time between measurements, and multiple Δ values resulting from changes in the activity may be used to generate a visual or other representation in the change in activity with the visual representation module 430 or may be used to link changes in activity to external events. For example, the system 400 may be used to show changes in social media activity associated with a particular web page, and how or if the changes in social media activity, such as chatter, is influenced by an advertisement, endorsement, news event, or other external event. This may be achieved manually or automatically by monitoring changes in Δ values to check for correlations with external events. Such a monitoring may be achieved manually by an end user or an administrator of the system 400 checking Δ values before, during, and after an event that might be expected to influence these values. For example, a mention by a celebrity or public figure of a particular website or product might cause a larger amount of activity for a given period of time for digital objects such as world wide web pages on that website or associated with that product. An end user may use the system 400 to check Δ values before, during, and after the mention, and may check the rate of change of activity with the object over time. Alternatively, such links may be monitored by linking the system 400 disclosed herein with an external system that monitors events such as advertisement appearances on television or radio, keyword monitoring of news events, keyword monitoring of social network activities such as publications on Twitter, or monitoring for other external events such as changes in weather, politics, sporting or news events that might precipitate increased social network activity associated with particular digital objects. For example the publication of particular advertisements or broadcasting of publicity at particular times might increase social media activity around digital objects mentioned in the advertisement. If so, the system 400 disclosed herein may be used alongside a system that monitors the publication of advertisements to demonstrate which advertisements are associated with the greatest positive Δ values, or speed of activity. Thus, advertisers seeking to generate social network activity may determine that some advertisements, or some publication times, are more effective than others for engendering changes in social network activity.

Figure 8:
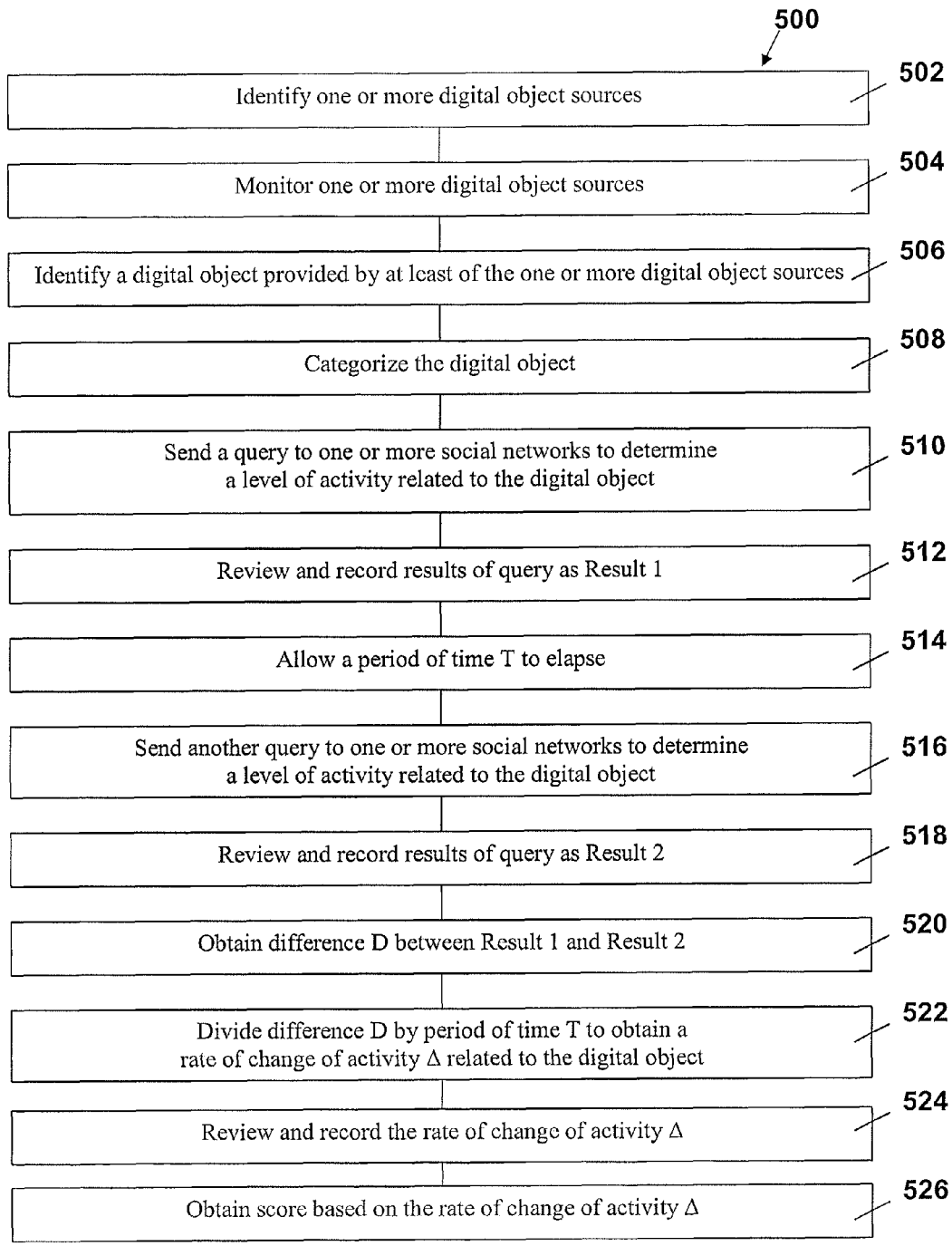
FIG. 8 is a chart of a method of tracking rate of change of social network activity associated with a digital object in accordance with an embodiment.

Referring to FIG. 8, a method 500 of ranking digital objects is shown. In step 502, one or more digital object sources can be identified. The digital object sources can be monitored, step 504. When a digital object is provided by at least one of the digital object sources, the digital object can be identified, step 506. When the digital object is identified, the digital object can be categorized, step 508. A query to one or more social networks can be sent to determine a level of activity related to the digital object, step 510. The results of the query can be reviewed and recorded as Result 1, step 512. A period of time T may be allowed to elapse, step 514. After a period of time has elapsed, another query can be sent to one or more social networks to determine a level of activity related to the digital object, step 516. Results of the query sent after a period of time has elapsed can be reviewed and recorded as Result 2, step 518. The difference D between Result 1 and Result 2 may be obtained, step 520. The difference D may next be divided by the period of time T that passed between the recording of Result 1 and Result 2 to obtain a rate of change of activity A related to the digital object, step 522. The resulting rate of change of activity A may be reviewed and recorded by the system, step 524. The score associated with the digital object may be directly derived from this rate of change of activity. Steps 510 to 526 may be repeated to offer a continuously updating score relating to the rate of change of social activity associated with the digital object.

Figure 9:
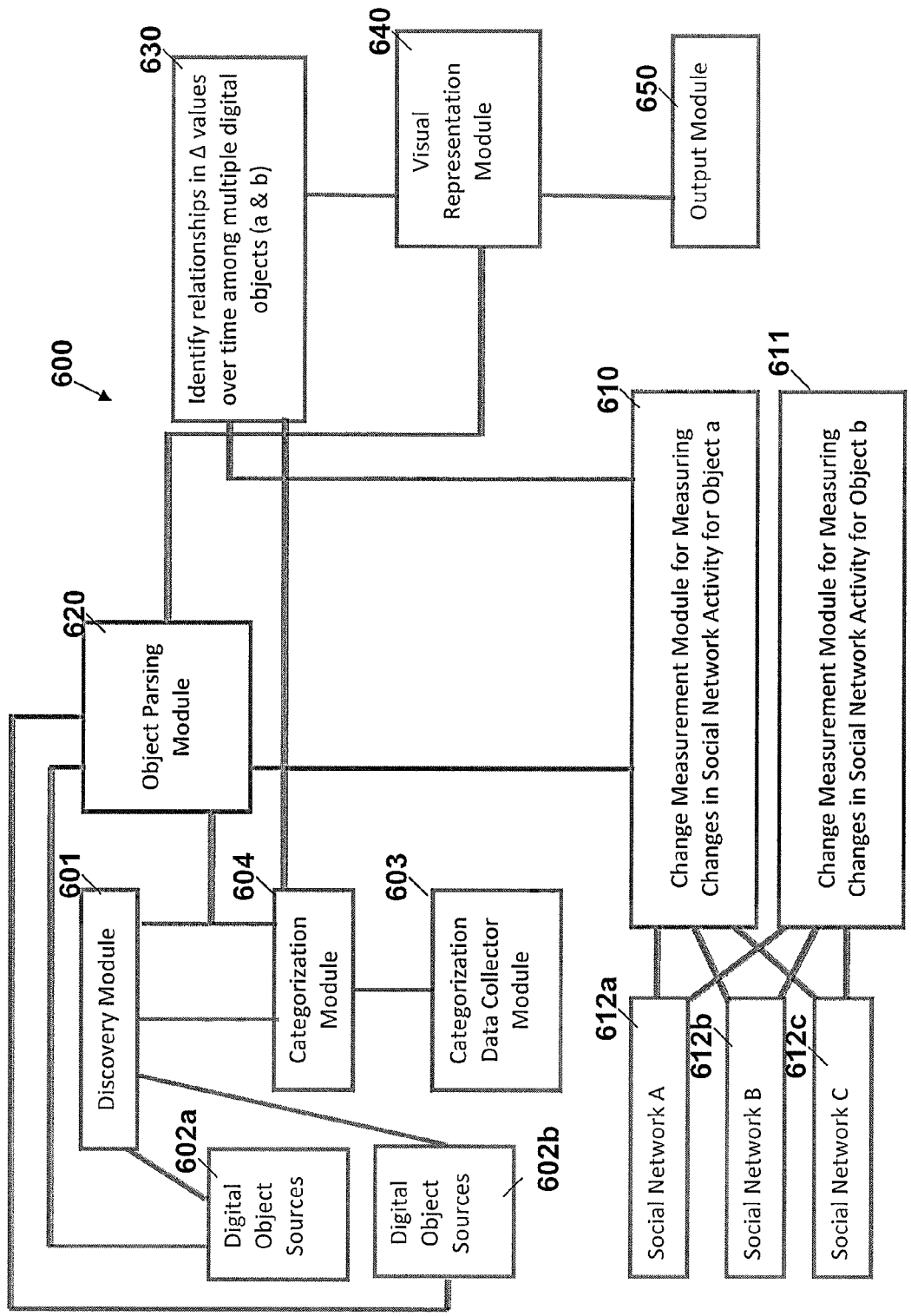
FIG. 9 is a block diagram of a digital object social activity tracking system in accordance with an embodiment.

Referring to FIG. 9, another construction is shown. The system 600 can identify relationships in Δ values associated with multiple digital objects. A discovery module 601 can identify objects from digital object sources 602a, 602b, and these can be categorized using the categorization module 604 using data inputted from the categorization data collector 603. The system 600 can include a plurality of change measurement modules 610, 611 that can each measure changes in each digital object. Each of the plurality of change measurement modules 610, 611 can be similar to the change measurement module 200 shown in FIG. 2. Each of the plurality of change measurement modules 610, 611 can obtain A values for each object, referred to as 'Object a' and 'Object b' in FIG. 10. A correlation detection module 630 can identify relationships in Δ values and changes in Δ values over time among multiple digital objects. An administrator or user of the system 600 may set parameters or sensitivities to identify differing closeness of correlations among categories of digital objects. The system 600 can further include a visual representation module 640 and an output module 650, which may be similar to the visual representation module 130 and the output module 140 shown in FIG. 1. The output module 650 can be an internet browser or a mobile device.

No other system available to businesses or consumers that either gathers digital objects from multiple sources, be these news stories or other online creative endeavors, appears to measure change in social network activity in the manner of the embodiments and constructions described herein. Also, no other system appears to indicate the rate of change of social network activity associated with all of these objects in the manner of the embodiments and constructions described herein. Embodiments may be used to rank the level of activity associated with news stories, culture, products, or other non-digital objects with associated digital embodiments.

With the components and constructions described above, a system and a method can measure changes in the level of social network activity associated with a digital object, and can use this information to calculate the rate of change of such activity for purposes including ranking digital objects based on their relative popularity over time. The embodiments and constructions herein may be applied to the ranking of objects using changes in the level of social network activity associated with the objects. Embodiments and constructions can normalize the ranking of particular object types or sources for specific users. Embodiments and constructions herein may also be applied to track changes in the level of social network activity associated with a digital object over time.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Finally, the steps of all methods described herein can be performed in any suitable order unless otherwise indicated herein or otherwise clearly contradicted by context.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media can be read by the computer, stored in the memory, and executed by the processor. Furthermore, the invention may employ any number of conventional techniques for electronics configuration, signal processing and/or control, data processing and the like. For the sake of brevity, conventional electronics, control systems, software development and other functional aspects of the systems (and components of the individual operating components of the systems) may not be described in detail.

Functional aspects may be implemented in algorithms that execute on one or more processors. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Also, using the disclosure herein, programmers of ordinary skill in the art to which the invention pertains can easily implement functional programs, codes, and code segments for making and using the invention.

The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical". The words "mechanism" and "element" are used broadly and are not limited to mechanical or physical embodiments, but may include software routines in conjunction with processors, etc. It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Numerous modifications and adaptations will be readily apparent to those of ordinary skill in this art without departing from the spirit and scope of the present invention as defined by the following claims. Therefore, the scope of the invention is defined not by the detailed description of the invention but by the following claims, and all differences within the scope will be construed as being included in the invention.

For example, the techniques disclosed herein may also be applied to measuring changes in social network activity independent for uses other than ranking the objects, including the provision of market intelligence, or the linking of external events with changes in social network activity relating to objects. The techniques may be used to test the effectiveness of particular advertisements or events for generating social network activity regarding products, services, individuals, or cultural objects mentioned in the advertisements or events.

What is claimed is:

1. A system for identifying a digital object that is gaining social activity by a plurality of users of a plurality of social networks, the system including a hardware processor configured to track a rate of change of the social activity and comprising:
    a change measurement program operated on the hardware processor in communication with a database of each of the plurality of social networks, the database of each of the plurality of social networks including data points of different types of interactions and different weights of each interaction, the change measurement program determines (1) a number of times each of the plurality of users have an interaction with the digital object and associated a weight with each type of interaction on the plurality of social networks at a first time to determine a first weighted value of all interactions at the first time, (2) a number of times each of the plurality of users have an interaction with the digital object and associated a weight with each type of interaction on the plurality of social networks at a second time to determine a second weighted value of interactions at the second time, and (3) a difference between the first weighted value and the second weighted value of interactions to determine the rate of change of the first and second weighted interactions of the social activity by the plurality of users, the rate of change indicating an increase, decrease, or stagnating interest in the digital object over a time period, the time period defined by the first and second times, wherein the change measurement program determines the rate of change of the digital object for each of the plurality of social networks; and
    a ranking program operated on the hardware processor in communication with the change measurement program, the ranking program ranks, based on a score derived from the rate of change, the digital object in comparison with other digital objects.

2. The system according to claim 1, wherein the digital object is an online news story that is associated with a unique identifier, the unique identifier allowing the users to interact with the digital object.

3. The system according to claim 1, wherein the ranking program assigns a weight to each different type of interactions by the plurality of users with the digital object, and determines the score of the digital object based on the rate of change and based on the weight associated with the interactions.

4. The system according to claim 1, wherein the interactions of the plurality of users include at least one of:
    mentioning the digital object in a comment by one of the plurality of users of the plurality of social networks, recommending the digital object by one of the plurality of users in one of the plurality of social networks, sharing the digital object on a page of one of the plurality of users of one of the plurality of social networks, commenting on the digital object by one of the plurality of users in one of a plurality of social networks.

5. The system according to claim 1, further comprising:
    a reviewing and recording when the rate of change for the digital object has changed.

6. The system according to claim 1, further comprising:
    a digital object discovery program, operated on the hardware processor, to identify the digital object after the digital object appears on the Internet.

7. A method for identifying a digital object that is gaining attention social activity by a plurality of users of a plurality of social networks, information of the digital object being published on the social network, the digital object being accessible by users of the social network by interaction, the method being performed by a hardware processor to track a rate of change of the social activity, the method comprising the steps of accessing a database of each of the plurality of social networks by a change measurement program operated on the hardware processor, each database including data points of different types of interactions of the plurality of users with the digital object in its social network;
    determining by the change measurement program a number of times each of the plurality of users have interacted with the digital object and associated a weight with each type of interaction on the plurality of social networks at a first time to determine a first weighted value of all interactions at the first time;
    determining by the change measurement program a number of times each of the plurality of users have interacted with the digital object and associated a weight with each type of interaction on the plurality of social networks at a second time to determine a second weighted value of interactions at the second time;
    determining by the change measurement program a difference between the first weighted value and the second weighted value of interactions to determine the rate of change of the first and second weighted interactions of social activity by the plurality of users, the rate of change indicating an increase, decrease, or stagnating interest in the digital object over a time period, the time period defined by the first and second times, wherein the change measurement program determines the rate of change of the digital object for each of the plurality of social networks; and
    ranking the digital object in comparison with other digital objects by a ranking program operated on the hardware processor in communication with the change measurement program, based on a score derived from the rate of change of the social activity by the plurality of users of the plurality of social networks.

8. The method according to claim 7, wherein the digital object is an online news story that is associated with a unique identifier, the unique identifier allowing the plurality of users to interact with the digital object.

9. The method according to claim 7, wherein the digital object is displayed on the plurality of social networks and is accessible by the plurality of users via the plurality of social networks, and wherein in the step of determining the rate of change, the change measurement program determines the rate of change for the plurality of users of the plurality of social networks for the digital object.

10. The method according to claim 7, further comprising the step of assigning a weight to different types of interactions by the plurality of users with the digital object by the ranking program, to determine the score of the digital object based on the rate of change and based on the weight associated with the interactions.

11. The method according to claim 7, wherein the interactions of the plurality of users include at least one of:

mentioning the digital object in a comment by one of the plurality of users of one of the plurality of social networks, recommending the digital object by one of the plurality of users in a plurality of social networks, sharing the digital object on a page of one of the plurality of users of one of the plurality of social networks, commenting on the digital object by one of the plurality of users in one of a plurality of social networks.

12. The method according to claim 7, further comprising the step of reviewing and recording when the rate of change for the digital object has changed.

13. The method according to claim 7, further comprising the step of identifying the digital object by a digital object discovery program operated on the hardware processor after the digital object appears on the Internet.

14. A non-transitory computer readable medium having computer instructions recorded thereon, the computer instructions configured to perform a method for identifying a digital object that is gaining attention by social network activity of a plurality of users on at least one of a plurality of social networks when performed on a hardware processor, the digital object being accessible by the plurality of users of the at least one of the plurality of social networks by interaction, the method to track a rate of change of the social network activity, the method comprising the steps of:

accessing a database of each of the plurality of social networks by a change measurement program operated on the hardware processor, the database including data points of different types of interactions of the plurality of users with the digital object within the social network;

determining by the change measurement program a number of times the plurality of users have interacted with the digital object and associated a weight with each type of interaction on the plurality of social networks at a first time to determine a first weighted value of interactions based on the database;

determining by the change measurement program a number of times each of the plurality of users have interacted with the digital object and associated a weight with each type of interaction on the plurality of social networks at a second time to determine a second weighted value of interactions at the second time;

determining by the change measurement program a difference between the first weighted value and the second weighted value of interactions to determine the rate of change of the first and second weighted interactions of social network activity, the rate of change indicating an increase, decrease, or stagnating interest in the digital object over a time period, the time period defined by the first and second times, wherein the change measurement program determines the rate of change of the digital object for each of the plurality of social networks; and ranking the digital object in comparison with other digital objects by a ranking program operated on the hardware processor in communication with the change measurement program, based on a score derived from the rate of change of the social network activity by the plurality of users of the plurality of social networks.

15. The non-transitory computer readable medium according to claim 14, wherein the digital object is an online news story that is associated with a unique identifier, the unique identifier allowing the plurality of users to interact with the digital object.

16. The non-transitory computer readable medium according to claim 14, wherein the change measurement program is in communication with a plurality of databases of a plurality of social networks, respectively, and the digital object is being displayed on the plurality of social networks, the digital object being accessible by the plurality of users via the plurality of social networks.

17. The non-transitory computer readable medium according to claim 14, the method further comprising the step of assigning a weight to different types of interactions by the plurality of users with the digital object by the ranking program, to determine the score of the digital object based on the rate of change and based on the weight associated with the interactions.

18. The non-transitory computer readable medium according to claim 14, wherein the interactions of the plurality of users include at least one of mentioning the digital object in a comment by one of the plurality of users of one of the plurality of social networks, recommending the digital object by one of the plurality of users in one of a plurality of social networks, sharing the digital object on a page of one of user of the plurality of users of one of the plurality of social networks, commenting on the digital object by one of the plurality of users in one of the plurality of social networks.

19. The non-transitory computer readable medium according to claim 14, the method further comprising the step of:

reviewing and recording when the rate of change for the digital object has changed.

20. The non-transitory computer readable medium according to claim 14, the method further comprising the step of:

identifying the digital object by a digital object discovery program operated on the hardware processor after the digital object appears on the Internet.

* * * * *